(12) United States Patent
Kim et al.

(10) Patent No.: US 10,133,436 B2
(45) Date of Patent: Nov. 20, 2018

(54) TOUCH SCREEN PANEL

(71) Applicant: SAMSUNG DISPLAY CO., LTD., Yongin-si, Gyeonggi-do (KR)

(72) Inventors: Chang-Bum Kim, Yongin-si (KR); Jung-Mok Park, Yongin-si (KR); Hyung-Chul Kim, Yongin-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 15/478,570

(22) Filed: Apr. 4, 2017

(65) Prior Publication Data
US 2017/0205918 A1   Jul. 20, 2017

Related U.S. Application Data

(63) Continuation of application No. 14/018,861, filed on Sep. 5, 2013, now Pat. No. 9,625,940.

(30) Foreign Application Priority Data

Oct. 5, 2012  (KR) .......................... 10-2012-0110882

(51) Int. Cl.
  *G06F 3/044*  (2006.01)
  *G06F 1/16*  (2006.01)
(52) U.S. Cl.
  CPC ................ *G06F 3/044* (2013.01); *G06F 1/16* (2013.01); *G06F 2203/04111* (2013.01)
(58) Field of Classification Search
  None
  See application file for complete search history.

(56) References Cited

U.S. PATENT DOCUMENTS

| 8,730,191 B2 | 5/2014 | Kim et al. |
| 2009/0213090 A1 | 8/2009 | Mamba et al. |

(Continued)

FOREIGN PATENT DOCUMENTS

| CN | 101943975 A | 1/2011 |
| CN | 102455820 A | 5/2012 |

(Continued)

OTHER PUBLICATIONS

European Office Action dated Dec. 20, 2017.

*Primary Examiner* — Robin Mishler
(74) *Attorney, Agent, or Firm* — Lee & Morse, P.C.

(57) ABSTRACT

A touch screen panel includes a plurality of first sensing electrodes on a substrate, the plurality of first sensing electrodes being connected to each other in a first direction, a plurality of second sensing electrodes between the first sensing electrodes on the substrate, the plurality of second sensing electrodes being connected to each other in a second direction intersecting the first direction, a plurality of first connecting patterns connecting the first sensing electrodes to each other in the first direction, a plurality of second connecting patterns connecting the second sensing electrodes to each other in the second direction, a first insulating layer at least between the first connecting patterns and the second connecting patterns, and dummy patterns in at least one of the first and second sensing electrodes, the dummy patterns having island-shapes and being insulated from the first and second sensing electrodes.

17 Claims, 5 Drawing Sheets

(56) References Cited

U.S. PATENT DOCUMENTS

| | | |
|---|---|---|
| 2009/0315854 A1 | 12/2009 | Matsuo |
| 2010/0134436 A1 | 6/2010 | Jeong et al. |
| 2010/0182255 A1* | 7/2010 | Jeong ............... G06F 3/044 345/173 |
| 2011/0007030 A1 | 1/2011 | Mo et al. |
| 2011/0050625 A1 | 3/2011 | Kim et al. |
| 2011/0141038 A1* | 6/2011 | Kuo ............... G06F 3/0412 345/173 |
| 2011/0234512 A1* | 9/2011 | Kim ............... G06F 3/044 345/173 |
| 2011/0248938 A1 | 10/2011 | Kwak et al. |
| 2012/0044165 A1 | 2/2012 | Kwak et al. |
| 2012/0098762 A1* | 4/2012 | Kim ............... G06F 3/044 345/173 |
| 2013/0313098 A1* | 11/2013 | Chang ............... G06F 3/044 200/600 |

FOREIGN PATENT DOCUMENTS

| | | |
|---|---|---|
| EP | 2 096 526 A2 | 9/2009 |
| EP | 2096526 A2 | 9/2009 |
| KR | 10-2009-0092695 A | 9/2009 |
| KR | 10-2009-0131638 A | 12/2009 |
| KR | 10-2011-0022269 A | 3/2011 |
| KR | 10-2011-0041043 A | 4/2011 |
| KR | 10-2011-0113925 A | 10/2011 |
| KR | 10-2012-0043406 A | 4/2012 |
| TW | 201120714 A | 6/2011 |

\* cited by examiner

FIG. 5

TOUCH SCREEN PANEL

CROSS-REFERENCE TO RELATED APPLICATIONS

This is a continuation application based on pending application Ser. No. 14/018,861, filed Sep. 5, 2013, the entire contents of which is hereby incorporated by reference.

This application claims priority to and the benefit of Korean Patent Application No. 10-2012-0110882, filed on Oct. 5, 2012, in the Korean Intellectual Property Office, the entire content of which is incorporated herein by reference.

BACKGROUND

1. Field

Example embodiments relate to a touch screen panel, and more particularly, to a touch screen panel capable of preventing a driving failure due to static electricity.

2. Description of the Related Art

A touch screen panel is an input device capable of inputting a user's instruction by selecting instruction contents displayed on a screen of an image display device, or the like, with a human's hand or an object. To this end, the touch screen panel is provided on a front surface of the image display device to convert a contact position directly contacted by the human hand or the object into an electric signal. Therefore, the instruction contents selected at the contact position is recognized as an input signal. Since the touch screen panel may be substituted for a separate input device operating by being connected to the image display device, such as a keyboard or a mouse, application fields thereof have been gradually extended.

Types implementing the touch screen panel may include, e.g., a resistive type touch screen panel, a photosensitive type touch screen panel, a capacitive type touch screen panel, and the like. For example, the capacitive type touch screen panel senses a change in capacitance formed between a conductive sensing electrode and other surrounding sensing electrodes or a ground electrode, or the like, when a human hand or an object contacts the touch screen panel, thereby converting a contact position into an electric signal.

In order to determine a contact position on a contact surface, the sensing electrodes are configured to include first sensing electrodes for lied to be connected to each other by first connecting patterns in a first direction and second sensing electrodes formed to be connected to each other by second connecting patterns in a second direction. The first connecting patterns and the second connecting patterns may have an insulating layer therebetween.

SUMMARY

Example embodiments are directed to a touch screen panel capable of preventing a driving failure due to static electricity.

According to one aspect of the example embodiments, there is provided a touch screen panel including a plurality of first sensing electrodes on a substrate, the plurality of first sensing electrodes being connected to each other in a first direction, a plurality of second sensing electrodes between the first sensing electrodes on the substrate, the plurality of second sensing electrodes being connected to each other in a second direction intersecting the first direction, a plurality of first connecting patterns connecting the first sensing electrodes to each other in the first direction, a plurality of second connecting patterns connecting the second sensing electrodes to each other in the second direction, a first insulating layer at least between the first connecting patterns and the second connecting patterns, and dummy patterns in at least one of the first and second sensing electrodes, the dummy patterns having island-shapes and being insulated from the first and second sensing electrodes.

The dummy patterns may be adjacent to intersections of the first sensing electrodes with the second sensing electrodes.

The dummy patterns may include first dummy patterns spaced away from edges of the sensing electrodes they are formed in.

The dummy patterns may include second dummy patterns contacting edges of the sensing electrodes they are formed in.

The dummy patterns may be in a same layer as that of the first and second sensing electrodes, the dummy patterns including a same material as the first and second sensing electrodes.

The second connecting patterns may be non-integral with the second sensing electrodes, the second connecting patterns being electrically connected to upper or lower portions of the second sensing electrodes to connect adjacent second sensing electrodes to each other in a line unit along the second direction.

The touch screen panel may further include protrusion patterns protruding from the second sensing electrodes toward adjacent first sensing electrodes, one end of each second connection pattern being electrically connected to a respective protrusion pattern.

The dummy patterns and the protrusion patterns may have a bent shape.

A plurality of protrusion patterns may extend between two adjacent second sensing electrodes, the protrusion patterns extend from respective second sensing electrodes in opposite directions with respect to each other.

The touch screen panel may further include a plurality of static electricity guidance patterns electrically connected to one of first and second sensing electrodes, the static electricity guidance patterns extending perpendicularly to the second connecting pattern toward an adjacent respective first or second sensing electrode, and the static electricity guidance patterns partially overlap the adjacent respective first or second sensing electrode.

The static electricity guidance patterns may be disposed in the same layer as that of the second connecting patterns and made of the same material as that of the second connecting patterns.

The dummy patterns and the static electricity guidance patterns may be disposed with the same size in regions symmetrical to each other based on the intersections of the first and second sensing electrodes.

The first and second sensing electrodes, the first connecting patterns, and the dummy patterns may be made of a transparent electrode material, and the second connecting patterns and the static electricity guidance patterns are made of an opaque metal material.

The first and second connecting patterns, the dummy patterns, and the static electricity guidance patterns may be disposed adjacent to each other.

The second connecting patterns may be electrically connected to the second sensing electrodes through contact holes formed in the first insulating layer at upper portions or lower portions of the second sensing electrodes.

The touch screen panel may further comprises outer wires connecting the first and second sensing electrodes to external driving circuits in a line unit along the first direction and the second direction, respectively.

The substrate may be set to an upper substrate of the display panel to be integrated with the display panel.

According to one aspect of the example embodiments, there is provided a touch screen panel including a plurality of first sensing electrodes on a substrate, the plurality of first sensing electrodes being connected to each other in a first direction, a plurality of second sensing electrodes between the first sensing electrodes on the substrate, the plurality of second sensing electrodes being connected to each other in a second direction intersecting the first direction, a plurality of first connecting patterns connecting the first sensing electrodes to each other in the first direction, a plurality of second connecting patterns connecting the second sensing electrodes to each other in the second direction, a first insulating layer at least between the first connecting patterns and the second connecting patterns, and protrusion patterns protruding from the second sensing electrodes toward adjacent first sensing electrodes, one end of each second connecting pattern being electrically connected to the a respective protrusion pattern.

BRIEF DESCRIPTION OF THE DRAWINGS

The accompanying drawings, together with the specification, illustrate exemplary embodiments, in which.

DETAILED DESCRIPTION

Hereinafter, exemplary embodiments of a touch screen panel will be described in detail with reference to the accompanying drawings.

Figure 1:
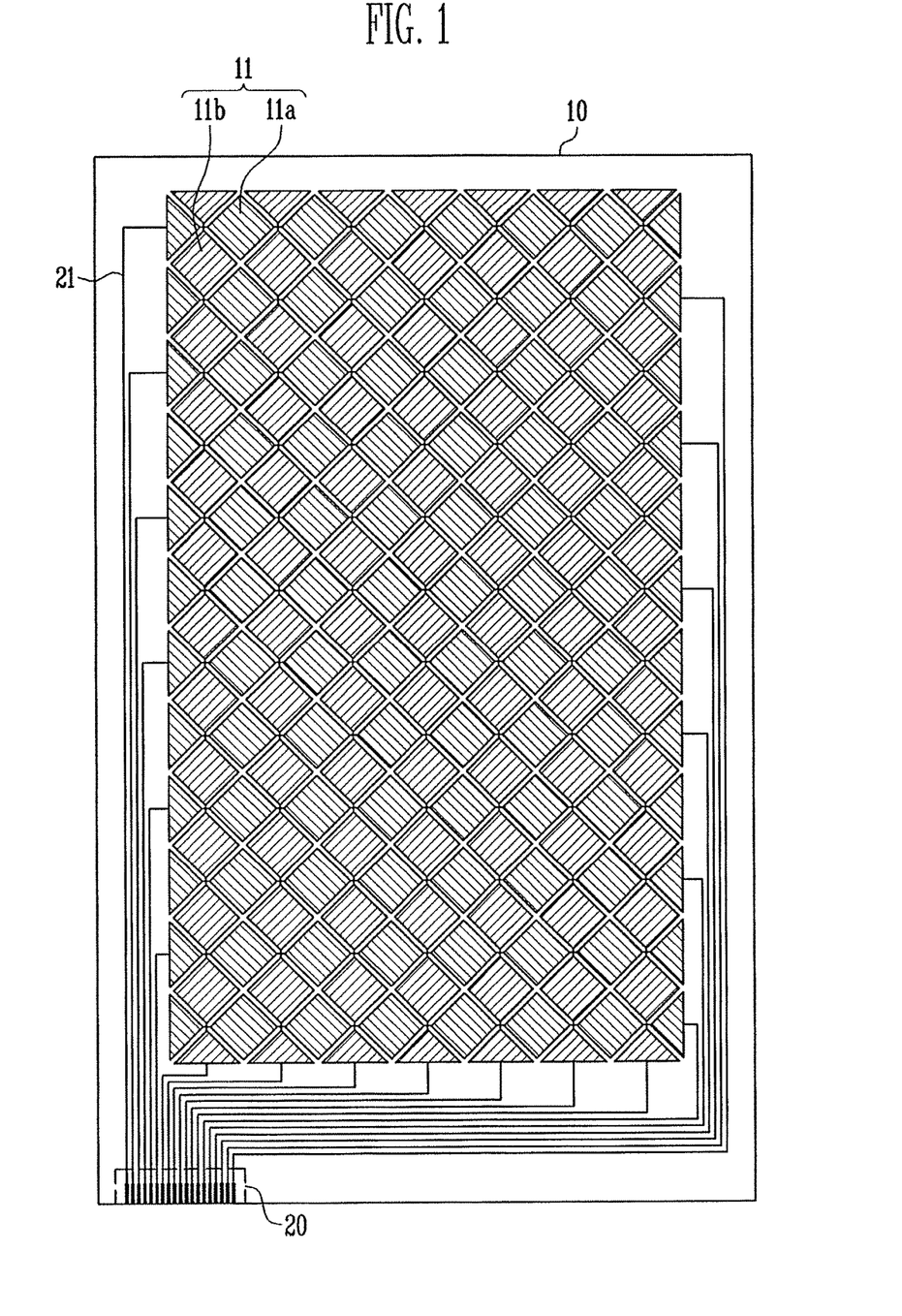
FIG. 1 is a plan view of an exemplary touch screen panel.

FIG. 1 is a plan view schematically showing an example of a touch screen panel.

Referring to FIG. 1, a touch screen panel is configured to include a substrate 10, sensing electrodes 11 formed in a touch active region on the substrate 10, and outer wires formed in a touch non active region outside the touch active region and connecting the sensing electrodes 11 to external driving circuits through a pad part 20. The touch active region overlaps with an image display region of a touch display panel (not shown) disposed at a lower portion of the touch screen panel to be viewed from the outside, and the touch non active region overlaps with a non display region not to be viewed from the outside, e.g., a region covered by a frame on the non display region or by a blocking layer which blocks light.

The substrate 10 may be a transparent substrate made of a flexible material. The sensing electrodes 11 include a plurality of first sensing electrodes 11a disposed in a distributed scheme in the touch active region on the substrate 10 and electrically connected to each other in the first direction, and a plurality of second sensing electrodes 11b disposed in a distributed scheme between the first sensing electrodes 11a and electrically connected to each other in the second direction intersected with the first direction. That is, the first sensing electrodes 11a and the second sensing electrodes 11b are alternately disposed to be connected to each other in opposite directions to each other.

For example, the first sensing electrodes 11a may be formed to be connected to each other in a row direction (horizontal direction), and to be connected to each of an outer wires 21 in a row unit. Similarly, the second sensing electrodes 11b may be formed to be connected to each other in a column direction (vertical direction), and to be connected to each of the outer wires 21 in a column unit. The above-mentioned first sensing electrodes 11a and second sensing electrodes 11b are made of a transparent electrode material, e.g., Indium Tin Oxide (ITO), so that light from the display panel (not shown) disposed at the lower portion may be transmitted.

It is noted that although simple lines without any symbols are shown in FIG. 1, the first connecting patterns disposed in a plural number in the first direction and connecting the first sensing electrodes 11a to each other in the first direction (for example, row direction), and the second connecting patterns disposed in a plural number in the second direction and connecting the second sensing electrodes 11b to each other in the second direction (for example, column direction) are further formed in the touch active region on the substrate 10. Exemplary embodiments and detailed descriptions of these connecting patterns will be described below.

The outer wires 21, which connect the first sensing electrodes 11a and the second sensing electrodes 11b to external driving circuits in a line unit along the first direction and the second direction, respectively, are connected, for example, to the first sensing electrodes 11a in the row unit and second sensing electrodes 11b in the column unit, respectively, and connect the sensing patterns to the external driving circuit (not shown), e.g., a position detecting circuit, through the pad part 20. The outer wires 21, which are disposed in the touch non-display region positioned at an outside of the screen panel, may not be positioned in the touch active region, in which an image is displayed. The outer wires 21 may be made of any suitable materials, e.g., low resistance metal materials, such as molybdenum (Mo), silver (Ag), titanium (Ti), copper (Cu), aluminum (Al), molybdenum/aluminum/molybdenum (Mo/Al/Mo), and the like, in addition to the transparent electrode material used to form the sensing electrodes 11.

In the touch screen panel, e.g., a capacitive type touch panel, when a contact object, e.g., a human hand, a stylus pen, or the like, contacts the touch panel, a change in capacitance according to a contact position is transferred from the sensing electrodes 11 to the driving circuit (not shown) via the outer wires 21 and the pad part 20. In this case, the change in capacitance is converted into an electrical signal by an X and Y input processing circuits, or the like (not shown), such that the contact position is recognized.

Figure 2:
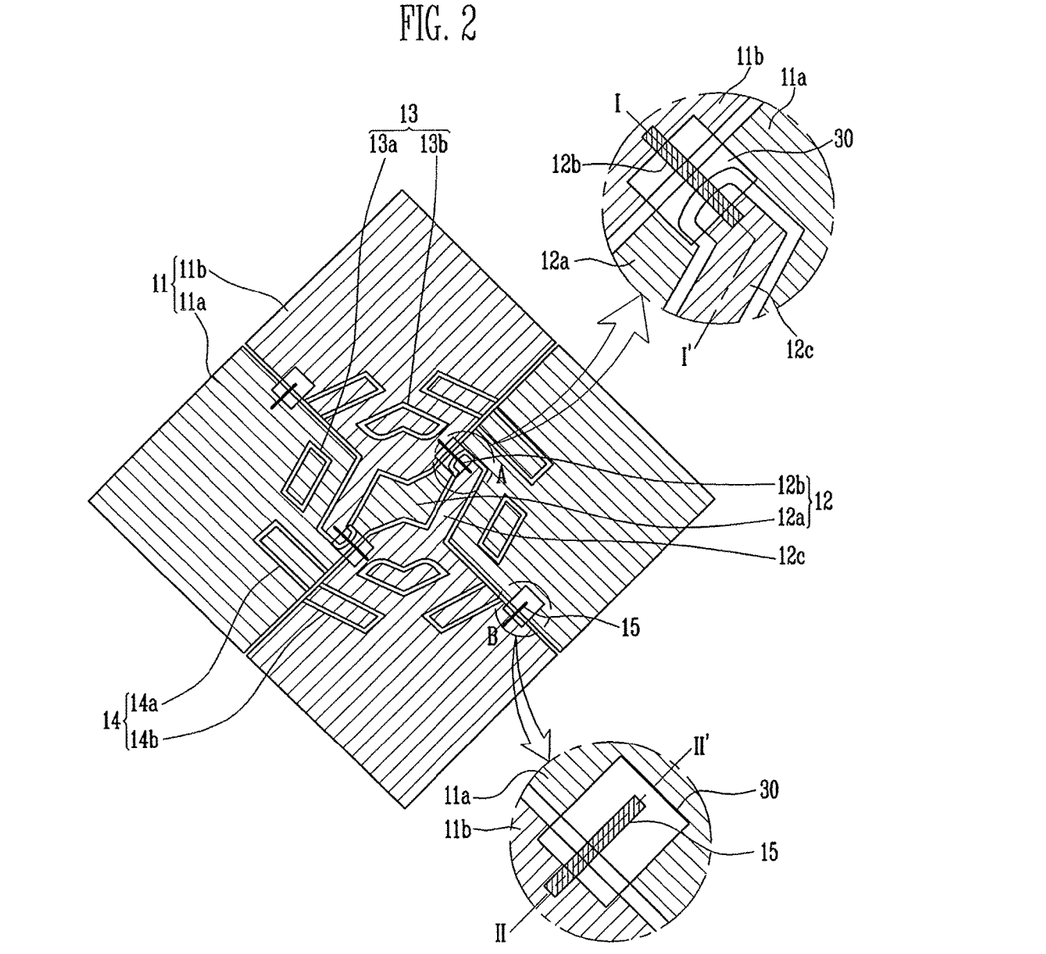
FIG. 2 is a plan view and partial enlarged views of a touch screen panel according to an exemplary embodiment.
Figure 3A:
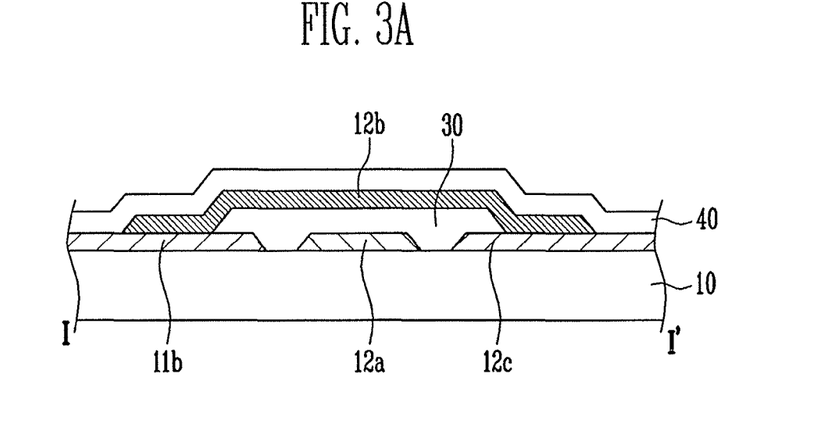
FIGS. 3A and 3B are cross sectional views of a touch screen panel taken along lines I-I' and II-II' in FIG. 2.
Figure 3B:
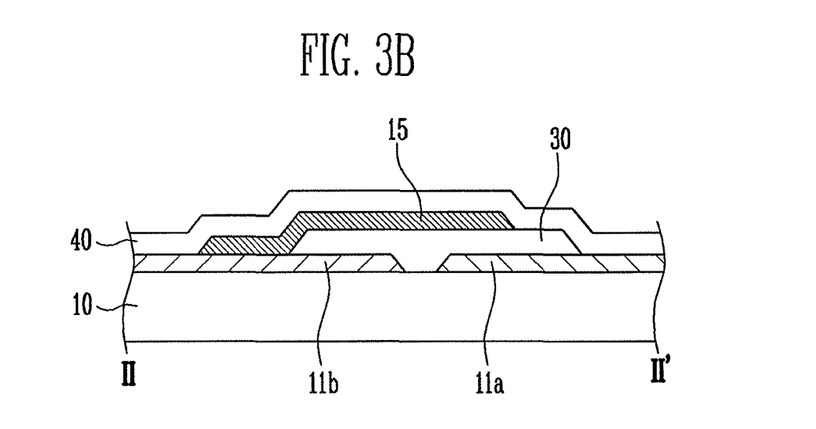

FIG. 2 is a plan view and partial enlarged views of a touch screen panel according to an exemplary embodiment, and FIGS. 3A and 3B are cross sectional views of a part of the touch screen panel taken along lines I-I' and of FIG. 2. For convenience, in FIG. 2, only two first sensing electrodes 11a adjacent to each other and a first connecting pattern 12a connecting therebetween, and two second sensing electrodes 11b adjacent to each other and a second connecting pattern 12b connecting therebetween will be illustrated. However, an actual touch screen panel has a structure in which the structure shown in FIG. 2 is repeatedly disposed in the touch active region. Therefore, first connecting patterns 12a and a plurality of second connecting patterns 12b will be described in plural forms.

Referring to region A of FIG. 2 and FIG. 3A, a touch screen panel according to the example embodiments includes the substrate 10, the plurality of first sensing electrodes 11a formed to be electrically connected to each other in a first direction in a touch active region on the substrate 10 and a plurality of second sensing electrodes 11b formed to be electrically connected to each other in a second direction in the touch active region on the substrate 10, a plurality of first connecting patterns 12a electrically connecting the first sensing electrodes 11a to each other in the first direction and a plurality of second connecting patterns 12b electrically connecting the second sensing electrodes 11b to each other in the second direction, a first insulating layer 30 interposed between the first connecting patterns 12a and the second connecting patterns 12b to secure insulation.

In some exemplary embodiments, the first insulating layer 30 may be partially disposed, e.g., only, between the first connecting patterns 12a and the second connecting patterns 12b so as to secure insulation. In other exemplary embodiments, the first insulating layer 30 may be, e.g., continuously, formed across the entire touch active region, in which the sensing electrodes are formed. In addition, according to a design structure, in order to protect patterns formed on the substrate 10, a second insulating layer 40 may be formed on the entire top surface of the touch screen panel.

Here, since the touch active region is made transparent so that images from the display panel may be visible, the first and second sensing electrodes 11a and 11b may be made of a transparent electrode material, e.g., ITO, and the first and/or second connecting patterns 12a and 12b may be made of the same material as that of the first and second sensing electrodes 11a and 11b or made of an opaque low resistance metal material. In the case of the opaque low resistance metal material, width, thickness, length, or the like, may be adjusted so that visibility of the connecting patterns is prevented or substantially minimized. For example, the first connecting patterns 12a may be made of a transparent electrode material, e.g., a same material as the first and second sensing electrodes 11a and 11b, and the second connecting patterns 12b may be made of an opaque low resistance metal material.

For example, the second sensing electrodes 11b may be each disposed between the first sensing electrodes 11a to have a separate pattern, but may be connected to each other by the second connecting patterns 12b in a line unit along the second direction. In another example, the first sensing electrodes 11a may each be disposed between the second sensing electrodes 11b to have a separate pattern, but may be connected to each other in a line unit along the first direction. However, those are merely examples, and in the present embodiment the second sensing electrodes 11b having a separate pattern will be mainly described.

The first insulating layer 30 is formed locally in the region in which insulation needs to be secured, such as intersections of the first connecting patterns 12a with the second connecting patterns 12b, but the second sensing electrodes 11b and the second connecting patterns 12b may be directly, e.g., and physically, connected to each other. In this case, contact resistance may be determined according to an area in which the second sensing electrodes 11b and the second connecting patterns 12b contact each other. In another exemplary embodiment, the second connecting patterns 12b may be patterned with a form divided into an upper layer and a lower layer of the second sensing electrodes 11b that they connect to each other, but both end portions of the second connecting patterns 12b may be electrically connected to adjacent sensing electrodes 11b through a contact hole (not shown) formed in the first insulating layer 30.

In connecting a second sensing electrode 11b to a second connecting pattern 12b, one or more contact holes may be used. However, in order to reduce contact resistance, it is preferable that two or more, i.e., a plurality of, contact holes may be used, and the number of contact holes may be adjusted in consideration of contact resistance, visibility, or the like.

Meanwhile, in the case in which the first connecting patterns 12a are made of the transparent electrode material, in patterning the transparent electrode material the first sensing electrodes 11a and the first connecting patterns 12a may be integrally formed in the line unit along the first direction to make the process simple. In addition, in the case in which the second connecting patterns 12b are made of the opaque low resistance low metal material, in forming the outer wires disposed in the touch non active region, the second connecting patterns 12b and the outer wires 21 may be simultaneously formed to make the process simpler. That is, the second connecting patterns 12b may be formed in the same layer as the outer wires 21 and made of the same material as that of the outer wires 21.

However, in the case of the second connecting patterns 12b made of the opaque low resistance metal material, the width of the second connecting patterns 12b may be limited so as to prevent visibility. Therefore, the second connecting patterns 12b may have a width narrower than that of the first connecting patterns 12a made of the transparent electrode material. In some exemplary embodiments, the second connecting patterns 12b may be designed in a shape inclined in a diagonal direction so as to prevent visibility more efficiently.

As described above, the second connecting patterns 12b, which are positioned in the touch active region exposed to the outside by overlapping with the image display surface, may have a decreased width to reduce visibility. In this case, due to static electricity concentrated at intersections of the first and second connecting patterns 12a and 12b, defects in the second connecting patterns 12b may be easily generated, and the defects may cause a driving failure of the touch screen panel. For example, if static electricity rapidly flows from the second sensing electrodes 11b, i.e., in the low resistance region, to the second connecting patterns 12b, i.e., in a high resistance region, a dielectric breakdown may be generated, thereby disconnecting the second connecting patterns 12b from each other.

Therefore, to prevent a driving failure of the touch screen panel due to static electricity, the touch screen panel according to example embodiments includes dummy patterns. In particular, referring to FIG. 2, dummy patterns 13 and 14 having island shapes may be formed within portions of the sensing electrodes 11. The dummy patterns 13 and 14 are electrically isolated from the first and second sensing electrodes 11a and 11b, and are disposed adjacent to intersections of the first and second sensing electrodes 11a and 11b. That is, the dummy patterns 13 and 14 may block a region (isolating region) on a travel route of the static electricity, thereby decreasing the width of the route and increasing a length thereof. Accordingly, the electric resistance of the route may increase, thereby preventing or substantially minimizing rapid flow of electricity to the high resistance region, i.e., to the intersection of the sensing electrodes.

In detail, referring to FIGS. 2 and 3A, the dummy patterns 13 and 14 may include first dummy patterns 13 spaced apart from, e.g., completely separated a predetermined distance from, edges of respective sensing electrodes they are formed in, and second dummy patterns 14, e.g., directly, contacting edges of the sensing electrodes they are formed in. Here, an "edge" is defined as a region, e.g., a border, between two adjacent first and second sensing electrodes 11a and 11b.

When static electricity having positive charges is introduced, the surface of the first dummy patterns 13 is charged with negative charges to attract the positive charges of the static electricity, thereby reducing impact generated by the static electricity introduced to the second connecting patterns 12b. The second dummy patterns 14 extend and bypass the travel route of the static electricity, so that the rate of introducing static electricity to the intersections of the sensing electrodes 11 is reduced.

For example, first dummy patterns 13a spaced away from the edge and second dummy patterns 14a contacting the edge are formed in a part of the first sensing electrodes 11a, and first dummy patterns 13b spaced away from the edge and second dummy patterns 14b contacting the edge are formed in a part of the second sensing electrodes 11b. The dummy patterns 13 and 14 may be disposed in a same layer as that of the first and second sensing electrodes 11a and 11b, and may be made of a same material as that of the first and second sensing electrodes 11a and 11b. For example, the dummy patterns 13 and 14 may be patterned together with the first and second sensing electrodes 11a and 11b of a transparent electrode material. In addition, in order to secure insulation, the first insulating layer 30 may be interposed between the dummy patterns 13 and 14 and the sensing electrodes 11 in which the dummy patterns 13 and 14 are formed.

In some exemplary embodiments, the dummy patterns 13 and 14 may have same respective sizes and may be disposed in regions symmetrical to each other based on the intersections of the first and second sensing electrodes 11a and 11b. For example, the dummy patterns 13a may be formed to have the same sizes in each first sensing electrode 11a, and may be disposed to be symmetrical to each other based on the first connecting patterns 12a. Similarly, the dummy patterns 14a may be formed to have the same sizes in each first sensing electrode 11a, and may be disposed to be symmetrical to each other based on the first connecting patterns 12a. Similarly, the dummy patterns 13b and 14b may be formed in the second sensing electrodes 11b to have the same sizes and be disposed in each of regions symmetrical to each other based on the second connecting patterns 12b.

In addition, the dummy patterns 13 and 14 may have a bent shape so that the travel route of electricity may be formed within the sensing electrodes 11. For example, two the second dummy patterns 14b may be positioned at edges of two respective sides of the second sensing electrode 11b, and the first dummy patterns 13b may be bent in an L shape and may be positioned the second sensing electrode 11b between the two second dummy patterns 14b. The above mentioned shape and position of the dummy patterns 13 and 14 is only an example, and the example embodiments are not limited thereto.

As further illustrated in FIGS. 2 and 3A, the second sensing electrodes 11b may have protrusion patterns 12c which protrude toward adjacent first sensing electrodes 11a. For example, if the second sensing electrode 11b has an approximate rectangular shape from a top view, the protrusion 12c may be a linear portion extending from an edge of the rectangular shape toward an adjacent first sensing electrode 11a, e.g., the first sensing electrode 11a may have a complementary shape with respect to the second sensing electrode 11b with the protrusion pattern 12c. Each second connecting pattern 12b extends from one second sensing electrode 11b to an end portions of a protrusion pattern 12c of an adjacent second sensing electrode 11b. The protrusion patterns 12c may prevent rapid introduction of static electricity to the connecting patterns 12b, which have a relatively narrow width, and may change the travel route of electricity in the sensing electrodes 11 together with the dummy patterns 13 and 14.

In some exemplary embodiments, a plurality of protrusion patterns 12c may be integrally included within respective second sensing electrodes. In other exemplary embodiments, the protrusion patterns 12c may be non-integral with the second sensing electrodes 11b and may extend from the second sensing electrodes 11b to which they are connected toward adjacent second sensing electrodes 11b. For example, in the present exemplary embodiment, the protrusion patterns 12c and the second sensing electrodes 11b are separated from each other, i.e., non-integral with each other, and are connected to the second connecting patterns 12b. However, in other exemplary embodiments, e.g., in the case in which the sensing electrodes 11a have separate patterns, the separate patterns may protrude from the first sensing electrodes 11a and may be connected to the first connecting patterns 12a.

In addition to the dummy patterns 13 and 14 and protrusion patterns 12c, the touch screen panel according to the example embodiments may further include a plurality of static electricity guidance patterns 15. The guidance patterns 15 may prevent driving failure of the touch screen panel due to static electricity more effectively, as will be discussed in more detail below.

Referring region B in FIG. 2 and FIG. 3B, the static electricity guidance patterns 15 are electrically connected to any one of the first and second sensing electrodes 11a and 11b, and may extend from the sensing electrode to which they are connected to an adjacent sensing electrode, so partial regions of the electricity guidance patterns 15 may overlap with the adjacent sensing electrodes. For example, as illustrated in FIG. 2, the static electricity guidance patterns 15 may be electrically connected to a second sensing electrode 11b and may extends along a direction perpendicular to a direction of the connecting pattern to partially overlap the first sensing electrode 11a, i.e., without being connected to the first sensing electrode 11a. For example, the first insulating layer 30 may be interposed between the static electricity guidance pattern 15 and the sensing electrodes not connected to but overlapping the static electricity introduction patterns 15, i.e., between the static electricity guidance pattern 15 and the first sensing electrode 11a.

The static electricity guidance patterns 15 may be made of the same material as that of the second connecting patterns 12b and may be formed in the same layer as the second connecting patterns 12b for simplification of the process. In addition, the static electricity guidance patterns 15 may be made of the same opaque low resistance metal material identical to those of the second connecting patterns 12b and outer wires 21.

In some exemplary embodiments, any one of sensing electrodes 11 connected to one-end portions of the static electricity guidance patterns 15 may be directly connected thereto. In this case, contact resistance may be determined according to, e.g., a size of, the contact area of the one-end portions of the static electricity guidance patterns 15 with the sensing electrodes 11.

In another exemplary embodiment, the static electricity guidance patterns 15 are patterned with a form divided into an upper layer and a lower layer of the sensing electrodes 11 to which they both connect to each other. One-end portions of the static electricity guidance patterns 15 may be connected to the sensing electrodes 11 through the contact hole formed in the first insulating layer 30.

When static electricity is guided to the static electricity guidance patterns 15 as described above, stability of the first and second connecting patterns 12a and 12b may be secured. Therefore, even when damage to the static electricity guidance patterns 15 occurs, e.g., disconnection, occurs, the damage has no effect on the driving of the touch screen panel.

As described above, dummy patterns 13 and 14 are formed within portions of the sensing electrodes 11, and/or protrusion patterns 12c are formed to protrude from the sensing electrodes 11 and to connect to the connecting patterns 12, such that width of the travel route of electricity may be reduced and the route may be bypassed at the intersections of the sensing electrodes 11. As a result, rapid introduction of static electricity to the high resistance region, i.e., the intersections of sensing electrodes 11, may be reduced. Therefore, driving failure of the touch screen panel due to static electricity may be prevented or substantially minimized. For example, the dummy patterns 13 and 14 use the same material as that of the sensing electrodes 11, so that it is advantageous to secure visibility, and the anti-static electricity function can be enhanced by increasing the sizes of the dummy patterns 13 and 14.

In addition, static electricity guidance patterns 15 are also formed to be electrically connected to the sensing electrodes 11 and extend in directions to the adjacent sensing electrodes, so that partial regions of the static electricity guidance patterns 15 overlap with the adjacent sensing electrodes. Therefore, driving failure of the touch screen panel due to static electricity may be prevented or substantially minimized more effectively.

Figure 4:
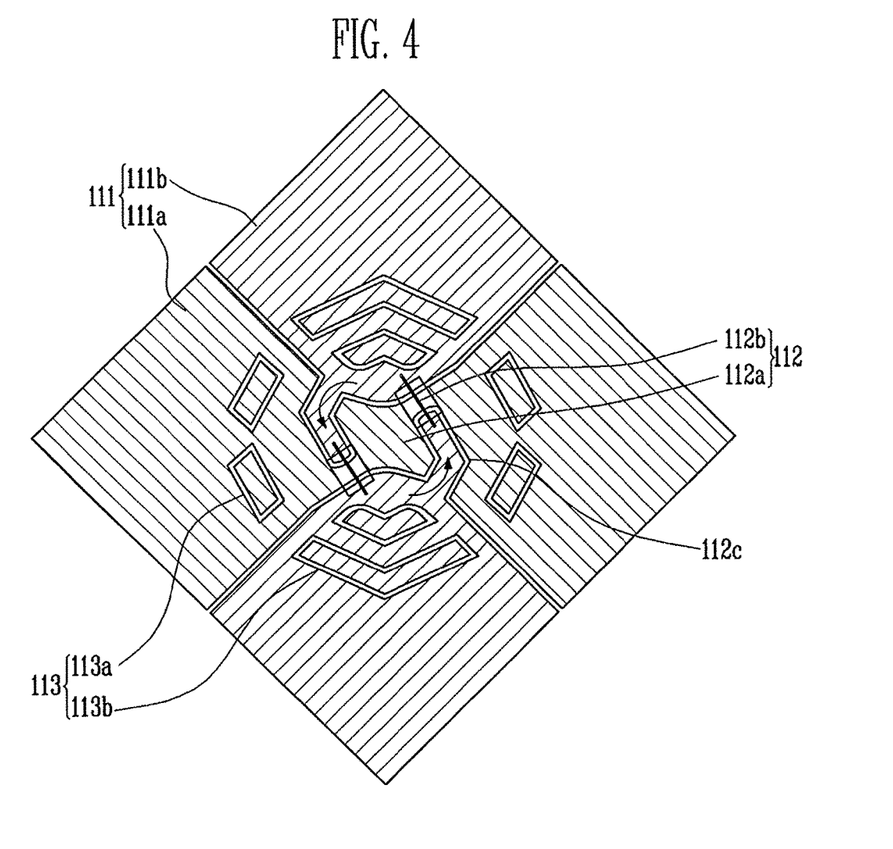
FIGS. 4 and 5 are plan views of modified exemplary embodiments of the touch screen panel FIG. 2.
Figure 5:
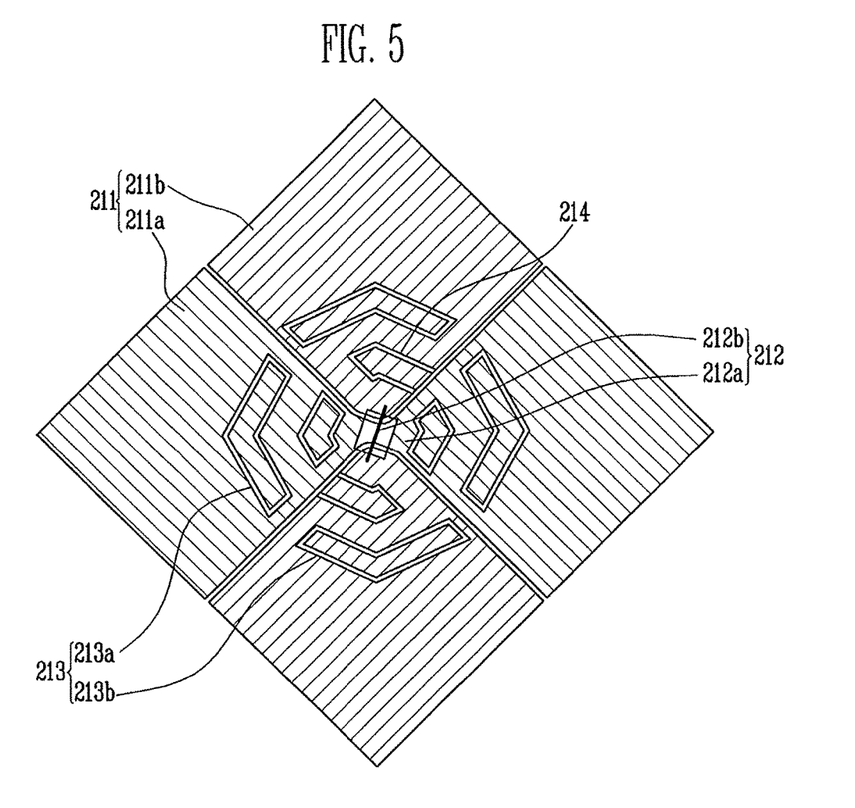

FIGS. 4 and 5 are plan views showing modified exemplary embodiments of the touch screen panel shown in FIG. 2. Same reference numerals refer to same components throughout, and repetitive description of same components will be omitted.

Referring to FIG. 4, the touch screen panel according to the present exemplary embodiment is configured to include only first dummy patterns 113, i.e., without second dummy patterns 14 and without static electricity guidance patterns 15. The first sensing electrodes 111a include a plurality of first dummy patterns 113a, and the second sensing electrodes 111b include a plurality of second dummy patterns 113b and protrusion patterns 112c. Here, the second dummy patterns 113b and protrusion patterns 112c may be L-shaped.

In some exemplary embodiments, the second dummy patterns 113b and the protrusion patterns 112c may be L-shaped. In other exemplary embodiment, the second dummy patterns 113b and the protrusion patterns 112c may be linearly shaped or curved, or may have a shape obtained by combining one or more of these shapes. The protrusion patterns 112c may increase the length of the travel route of electricity between the second sensing electrodes 111b.

Referring to FIG. 5, the touch screen panel according to the present exemplary embodiment is configured to include only first dummy patterns 213 and second dummy patterns 214, i.e., without the static electricity guidance patterns 15. The first sensing patterns 211a include a plurality of first dummy patterns 213a, and the second sensing electrodes 211b are connected to each other just by the second connecting patterns 212b, i.e., without protrusion patterns 12c, and include a first dummy pattern 213a and a second dummy pattern 214. Here, the first connecting patterns 212a and the second connecting patterns 212b may be designed in a shape inclined in a diagonal direction.

As described above, the dummy patterns, protrusion patterns, and static electricity guidance patterns, which reduce the introduction of static electricity, may be formed in any suitable number, shape, and position. For example, the touch screen panel may be configured with only the static electricity guidance patterns and the protrusion patterns without the dummy patterns.

In the touch screen panel according to the example embodiments, touch sensing patterns, e.g., the first and second sensing electrodes 11a and 11b and the first and second connecting patterns 12a and 12b, may be directly formed on the display panel. Therefore, the example embodiments may be usefully applied to integrate the touch screen with the display panel.

More specifically, a display panel integrated touch screen panel may be provided, wherein the substrate 10 of the touch screen panel is an upper substrate of the display panel, so the touch sensing patterns, e.g., the first and second sensing electrodes 11a and 11b, are formed on a surface of the upper substrate of the display panel. In this case, a thickness of the first insulating layer 30 between the first and second connecting patterns 12a and 12b may be restricted. For example, when the display panel is an organic light emitting display panel having upper and lower substrates sealed by frit, use of a conventional thick organic insulating layer may cause the organic insulating layer to break due to high firing temperature of the frit. Therefore, the organic insulating layer may be replaced with an inorganic insulating layer.

That is, when the substrate 10 of the touch screen panel is the upper substrate of the display panel integrated with the touch screen panel, the first insulating layer 30 is an inorganic insulating layer formed entirely on the touch active region in which the first and second sensing electrodes 11a and 11b and the first and second connecting patterns 12a and 12b are formed. Here, the inorganic insulating layer has a limited thickness, e.g., as compared to the conventional organic insulating layer, due to a film stress.

Further, to avoid vulnerability of the inorganic insulating layer 30 to static electricity, e.g., due to the restricted thickness, at least one of the protrusion patterns 12c, the dummy patterns 13 and 14, and the static electricity guidance patterns 15, is formed according to the example embodiments described above. As such, the vulnerability to static electricity is eliminated or substantially minimized, whereby the touch screen according to the example embodiments may be usefully applied to the integrated structure with the display panel.

By way of summary and review, according to the example embodiments, dummy patterns may be formed within regions of the sensing electrodes and/or protrusion patterns protruding from the sensing electrodes and connected to connecting patterns may be formed. As such, width of the travel route of electricity may be reduced and the route may be bypassed at the intersections of the sensing electrodes. As a result, rapid introduction of static electricity to the high resistance region, which is the intersections of sensing electrodes, may be reduced. Therefore, driving failure of the touch screen panel due to static electricity may be prevented or substantially reduced.

In addition, the dummy patterns use the same material as that of the sensing electrodes, so that it is advantageous to secure visibility, and the anti-static electricity function can be enhanced by increasing the sizes of the dummy patterns. Further, static electricity guidance patterns are also formed to be electrically connected to the sensing electrodes and extend in directions to the adjacent sensing electrodes so that partial regions thereof overlap with the adjacent sensing electrodes. Therefore, the driving failure of the touch screen panel due to static electricity may be prevented or substantially minimized more effectively.

In contrast, when conventional first connecting patterns and second connecting patterns have widths narrower than those of the sensing electrodes themselves, the connecting patterns may have a relatively large resistance and may be easily damaged. When the intersection between the connecting patterns is damaged, e.g., a dielectric breakdown, a disconnection, or the like due to static electricity, driving failure may occur.

While the example embodiments has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel, comprising:
a plurality of first sensing electrodes on a substrate;
a plurality of second sensing electrodes between the first sensing electrodes on the substrate;
a plurality of first connecting patterns connecting the first sensing electrodes disposed in a same row;
a plurality of second connecting patterns connecting the second sensing electrodes disposed in a same column; and
a first insulating layer between the first connecting patterns and the second connecting patterns, wherein:
for an upper second sensing electrode and a lower second sensing electrode that are disposed immediately adjacent to each other in the same column, the upper second sensing electrode is electrically connected to the lower second sensing electrode by exactly two protrusion patterns, one protruding from each of the upper and lower second sensing electrodes, and two second connecting patterns, one end of each second connecting pattern being electrically connected to a respective protrusion pattern,
the protrusion patterns protrude along a direction that is not parallel to a column direction and a row direction, and
a longitudinal direction of the second connecting patterns is not parallel with the column direction and the row direction.

2. The touch screen panel of claim 1, further comprising a second insulating layer formed to cover an entire top surface of the touch screen panel.

3. The touch screen panel of claim 1, wherein the first connecting patterns and the protrusion patterns have a bent shape.

4. The touch screen panel of claim 1, wherein the first and second sensing electrodes and the first connecting patterns include a transparent electrode material, and the second connecting patterns include an opaque metal material.

5. The touch screen panel of claim 4, further comprising outer wires connecting the first and second sensing electrodes to an external driving circuit.

6. The touch screen panel of claim 5, wherein the second connecting patterns include a same material as the outer wires.

7. The touch screen panel of claim 1, wherein the second connecting patterns have an inclined shape in a diagonal direction.

8. A touch screen panel, comprising:
a plurality of first sensing electrodes on a substrate;
a plurality of second sensing electrodes between the first sensing electrodes on the substrate;
a plurality of first connecting patterns connecting the first sensing electrodes disposed in a same row;
a plurality of second connecting patterns connecting the second sensing electrodes disposed in a same column; and
a first insulating layer between the first connecting patterns and the second connecting patterns, wherein:
for an upper second sensing electrode and a lower second sensing electrode that are disposed immediately adjacent to each other in the same column, the upper second sensing electrode is electrically connected to the lower second sensing electrode by exactly two protrusion patterns, one protruding from each of the upper and lower second sensing electrodes, and two second connecting patterns, one end of each second connecting pattern being electrically connected to a respective protrusion pattern,
a longitudinal direction of the second connecting patterns is not parallel with a column direction and a row direction,
end portions of the second connecting patterns are located on the first insulating layer,
the second connecting patterns are electrically connected to adjacent second sensing electrodes through a contact hole formed in the first insulating layer, and
the protrusion patterns protrude along a direction that is not parallel to the column direction and the row direction.

9. The touch screen panel of claim 8, further comprising a second insulating layer formed to cover an entire top surface of the touch screen panel.

10. The touch screen panel of claim 8, wherein the first connecting patterns and the protrusion patterns have a bent shape.

11. The touch screen panel of claim 8, wherein the second connecting patterns have an inclined shape in a diagonal direction.

12. A touch screen panel, comprising:
a plurality of first sensing electrodes on a substrate;
a plurality of second sensing electrodes between the first sensing electrodes on the substrate;
a plurality of first connecting patterns connecting the first sensing electrodes disposed in a same row;
a plurality of second connecting patterns connecting the second sensing electrodes disposed in a same column;
a first insulating layer between the first connecting patterns and the second connecting patterns;
protrusion patterns protruding from each of the second sensing electrodes toward adjacent second sensing electrodes, one end of each second connecting pattern being electrically connected to a respective protrusion pattern; and
dummy patterns in at least one of the first and second sensing electrodes, the dummy patterns having island-shapes and being insulated from the first and second sensing electrodes, a longitudinal direction of at least one dummy pattern being non-parallel with an adjacent edge of the first and second sensing electrodes in which the at least one dummy pattern is formed.

13. The touch screen panel of claim 12, wherein the dummy patterns are adjacent to intersections of the first sensing electrodes with the second sensing electrodes.

14. The touch screen panel of claim 12, wherein the dummy patterns are spaced away from edges of the sensing electrodes in which the dummy patterns are formed.

15. The touch screen panel of claim 12, wherein the dummy patterns are in a same layer as the first and second sensing electrodes, the dummy patterns including a same material as the first and second sensing electrodes.

16. A touch screen panel, comprising:
a plurality of first sensing electrodes on a substrate;
a plurality of second sensing electrodes between the first sensing electrodes on the substrate;
a plurality of first connecting patterns connecting the first sensing electrodes disposed in a same row;
a plurality of second connecting patterns connecting the second sensing electrodes disposed in a same column;
a first insulating layer between the first connecting patterns and the second connecting patterns; and
a plurality of static electricity guidance patterns electrically connected to one of the first and second sensing electrodes, the static electricity guidance patterns extending to each of the second connecting patterns toward an adjacent respective first or second sensing electrode, the static electricity guidance patterns partially overlapping the adjacent respective first or second sensing electrode, wherein:
for an upper second sensing electrode and a lower second sensing electrode that are disposed immediately adjacent to each other in the same column, the upper second sensing electrode is electrically connected to the lower second sensing electrode by exactly two protrusion patterns, one protruding from each of the upper and lower second sensing electrodes, and two second connecting patterns, one end of each second connecting pattern being electrically connected to a respective protrusion pattern,
a longitudinal direction of the second connecting patterns is not parallel with a column direction and a row direction, and
the protrusion patterns protrude along a direction that is not parallel to the column direction and the row direction.

17. The touch screen panel of claim 16, wherein the static electricity guidance patterns are disposed in a same layer as the second connecting patterns and include a same material as the second connecting patterns.

* * * * *